United States Patent
Shinoda et al.

(10) Patent No.: US 10,796,455 B2
(45) Date of Patent: Oct. 6, 2020

(54) IMAGE PROCESSING APPARATUS AND IMAGE PROCESSING METHOD

(71) Applicant: Panasonic Intellectual Property Management Co., Ltd., Osaka (JP)

(72) Inventors: Masayo Shinoda, Tokyo (JP); Chie Nishi, Kanagawa (JP); Sachiko Takeshita, Tokyo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 142 days.

(21) Appl. No.: 16/198,318

(22) Filed: Nov. 21, 2018

(65) Prior Publication Data
US 2019/0096093 A1 Mar. 28, 2019

Related U.S. Application Data

(63) Continuation of application No. PCT/JP2017/020458, filed on Jun. 1, 2017.

(30) Foreign Application Priority Data

Jun. 29, 2016 (JP) ................. 2016-128945

(51) Int. Cl.
*G06T 7/90* (2017.01)
*A45D 44/00* (2006.01)
(Continued)

(52) U.S. Cl.
CPC ............... *G06T 7/90* (2017.01); *A45D 44/00* (2013.01); *B41M 5/0076* (2013.01);
(Continued)

(58) Field of Classification Search
CPC . G06T 7/90; G06T 11/001; G06T 7/11; G06T 7/0016; G06T 2207/30201;
(Continued)

(56) References Cited

U.S. PATENT DOCUMENTS

| 2015/0059968 A1* | 3/2015 | Shinoda ................. A45D 33/38 156/240 |
| 2017/0251130 A1* | 8/2017 | Shinoda ................. G06K 9/342 |
| 2017/0259599 A1* | 9/2017 | Shinoda ............. H04N 1/00023 |

FOREIGN PATENT DOCUMENTS

JP 2015-043836 3/2015

OTHER PUBLICATIONS

Lipowezky et al. "Automatic Freckles Detection and Retouching." IEEE 25th Convention of Electrical and Electronics Engineers in Israel, Dec. 3, 2008, pp. 142-146 (Year: 2008).*

(Continued)

*Primary Examiner* — Jon Chang
(74) *Attorney, Agent, or Firm* — Greenblum & Bernstein, P.L.C.

(57) ABSTRACT

An image processing apparatus includes an image acquirer that acquires a first skin image obtained by capturing an image of a skin at a first timing and a second skin image obtained by capturing an image of the skin at a second timing later than the first timing, an image analyzer that extracts a first discolored area from a first skin image and extracts a color of the skin from the second skin image, an image determiner that determines a cover area within the second skin image based on the first discolored area and determines a color of the cover area based on the color of the skin, and a print controller that generates image data with a content for printing an image of the determined cover area on the sheet by using a coloring material of the determined color.

15 Claims, 7 Drawing Sheets

(51) Int. Cl.
  *G06T 11/00* (2006.01)
  *G06T 7/11* (2017.01)
  *B41M 5/00* (2006.01)
  *G06T 7/00* (2017.01)
  *B41M 3/12* (2006.01)

(52) U.S. Cl.
  CPC .............. *G06T 7/0016* (2013.01); *G06T 7/11* (2017.01); *G06T 11/001* (2013.01); *B41M 3/12* (2013.01); *G06T 2207/10024* (2013.01); *G06T 2207/30088* (2013.01); *G06T 2207/30201* (2013.01)

(58) Field of Classification Search
  CPC ........... G06T 2207/10024; G06T 2207/30088; A45D 44/00; A45D 2044/007; A45D 44/005; B41M 5/0076; B41M 3/12
  See application file for complete search history.

(56) References Cited

OTHER PUBLICATIONS

International Search Report of PCT application No. PCT/JP2017/020458 dated Jul. 11, 2017.

\* cited by examiner

| COORDINATES | AREA | COLOR DIFFERENCE |
|---|---|---|
| (2, 4) | 78.5 mm$^2$ | 4.5 |
| (6, 4) | 31 mm$^2$ | 5.0 |
| (4, 4) | 4 mm$^2$ | 2.3 |
| (6, 5) | 5 mm$^2$ | 3.3 |

| UV INDEX | COEFFICIENT | UV-CUTTING INGREDIENT DENSITY |
|---|---|---|
| 11+ | 0.5 | 2.5 |
| 8-10 | 0.6 | 2.0 |
| 6-7 | 0.7 | 1.5 |
| 3-5 | 0.8 | 1.2 |
| 1-2 | 1.0 | 1.0 |

IMAGE PROCESSING APPARATUS AND IMAGE PROCESSING METHOD

BACKGROUND

1. Technical Field

The present disclosure relates to an image processing apparatus and an image processing method for generating image data for printing an image on a sheet stickable to a skin.

2. Description of the Related Art

There is a conventional technique to make a discolored area of a skin, such as a spot on a cheek, inconspicuous (for example, see Japanese Unexamined Patent Application Publication No. 2015-43836). In a technique disclosed in Japanese Unexamined Patent Application Publication No. 2015-43836 (hereafter referred to as a "related technique"), a discolored area of a skin and a color of a non-discolored area are extracted from a photographed image of a skin, and the color of the non-discolored area is printed in an area, corresponding to the discolored area, of a sheet stickable to the skin. Such a related technique allows it to make a discolored area of a skin inconspicuous by performing a simple operation of sticking a sheet to the skin.

SUMMARY

However, in addition to simply making a discolored area inconspicuous, it is also important to further take care of the discolored area after it has become inconspicuous. For example, in a case where a laser treatment is performed on a spot, an area where the spot originally existed gradually becomes inconspicuous. However, it is desirable to continuously take care of the area such that an external stimulus such as ultraviolet rays or the like to the area is reduced. Thus, it is desired to provide a technique capable of simply taking care of a discolored area which has become inconspicuous.

One non-limiting and exemplary embodiment provides an image processing apparatus and an image processing method capable of simply taking care of a discolored area which has become inconspicuous.

In one general aspect, the techniques disclosed here feature an image processing apparatus that generates image data for use in printing an image on a sheet stickable to a skin. The image processing apparatus includes an image acquirer that acquires a first skin image obtained by capturing an image of a skin at a first timing and a second skin image obtained by capturing an image of the skin at a second timing later than the first timing, an image analyzer that determines a discolored area extracted from the first skin image as a first discolored area and extracts a color of the skin from the second skin image, an image determiner that determines a cover area, to be covered with the sheet, in the second skin image based on the first discolored area and determines a color of the cover area based on the color of the skin, and a print controller that generates image data with a content for printing an image of the determined cover area on the sheet by using a coloring material of the determined color. According to the aspect of the present disclosure, it is possible to easily take care of a discolored area after the discolored area becomes inconspicuous.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

An embodiment of the present disclosure is described in detail below referring to drawings.

Underlying Knowledge Forming Basis of the Present Disclosure

In the related technique, an image is printed on a sheet (also called a makeup sheet or a cover sheet) based on a result of extraction from an image of a current skin such that the sheet makes the discolored area of the skin inconspicuous. For a discolored area, in addition to simply make it inconspicuous, it is also important to provide care after it becomes inconspicuous.

For example, when a laser treatment is performed on a spot (which is an example of a discolored area), a scab is formed in an area where the spot originally existed (hereinafter, referred to as an "affected part"), and the affected part tends to have an inflammatory pigmentation. Therefore, after the scab peels off and the affected part becomes inconspicuous, it is needed to take care of the affected part for a particular period (for example, several week to several months) such that the affected part is protected from an external stimulus such as friction, ultraviolet rays, or the like.

In such a situation, if a cover area (an area to be covered with a sheet) is determined based on a discolored area in an image of a present skin using a fixed threshold value, the affected part is detected as a cover area until the scab peels off. However, once the scab peels off, a new skin appears in the affected part and thus the affected part is no longer detected as the cover area. This makes it difficult for a user to take care of the affected part after the affected part becomes inconspicuous.

To handle the above situation, in the present disclosure, in a case where a discolored area in an image of a present skin includes a discolored area which was a cover area in the past, the threshold value is adjusted to be smaller, and the determination as to the cover area in the image of the present skin is performed using the adjusted threshold value. Thus, the present disclosure makes it possible to easily determine the affected part inconspicuous after losing the scab as the cover area, and thus it becomes possible to easily take care of the affected part after it becomes inconspicuous.

System Configuration

First, an outline of a makeup assist system including an image processing apparatus according to the present embodiment is described below with reference to FIG. 1.

Figure 1:
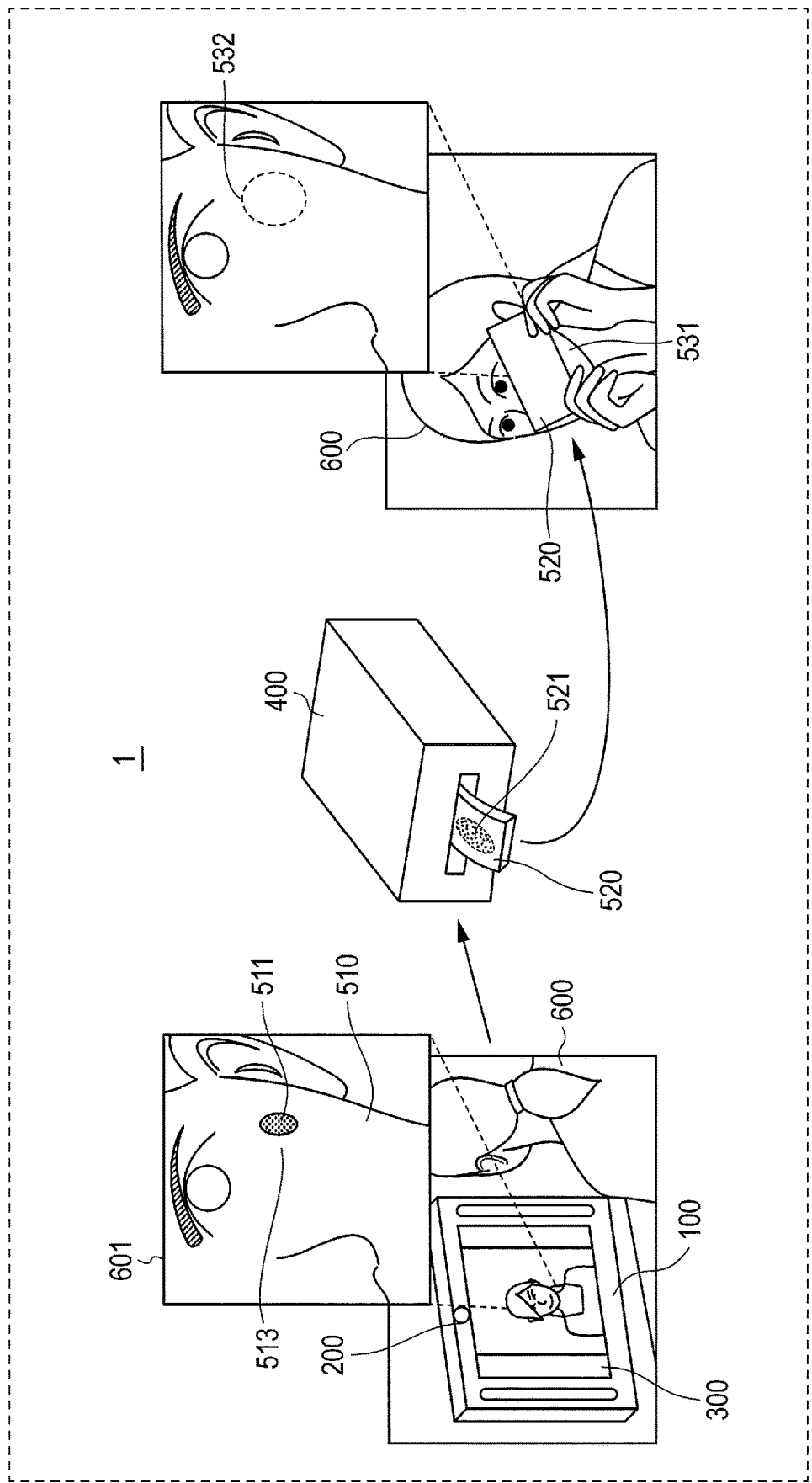
FIG. 1 is a schematic diagram illustrating an outline of an example of a makeup assist system according to the present disclosure.

FIG. 1 is a schematic diagram illustrating an outline of an example of a makeup assist system.

The makeup assist system 1 illustrated in FIG. 1 is installed, for example, in a factory, a cosmetics shop, a beauty salon, a medical institution, a makeup room for taking care of appearance, an event venue, a personal residence, or the like.

In FIG. 1, the makeup assist system 1 includes an image processing apparatus 100, an image capturing apparatus 200, a display apparatus 300, and a printing apparatus 400. The image processing apparatus 100 and the printing apparatus 400 are installed, for example, in a factory, a cosmetics shop, a beauty salon, a medical institution, a makeup room for taking care of appearance, an event venue, a personal residence, or the like.

In FIG. 1, by way of example, the image processing apparatus 100 includes the image capturing apparatus 200 and the display apparatus 300. However, as described later with reference to FIG. 2, the image capturing apparatus 200 and the display apparatus 300 may be disposed outside the image processing apparatus 100.

The image capturing apparatus 200 captures an image of a face of a user 600 located directly in front of the display apparatus 300 while illuminating the face with light thereby acquiring a face image 601. The face image 601 includes an image of a face skin area (hereinafter referred to as a "skin image") 510.

Although in the present embodiment, a face image is taken as an example, the image subjected to the process by the image processing apparatus 100 is not limited to the face image, but other images such as an image of a back of a hand or an arm skin may be employed.

The display apparatus 300 displays the face image 601 taken by the image capturing apparatus 200. For example, the display apparatus 300 displays the face image 601 in a horizontally inverted manner as shown in FIG. 1. This makes it possible for a user 600 to feel as if the user 600 looked at his/her face in a mirror.

In the present embodiment, it is assumed that the display apparatus 300 is a liquid crystal display with a touch panel also functioning as an operation apparatus capable of accepting various operations by a user. Note that various operations by the user are not limited to those performed by touching the touch panel with a finger or a stylus pen, but various operations may be performed by pressing a physical button (not illustrated in the figure) of the image processing apparatus 100, or inputting may be performed by a gesture operation or via a voice.

The image processing apparatus 100 extracts a discolored area 511 of a skin image 510 from the face image 601 (or an unreversed image), and detects a location (indicated by, for example, coordinates as described later), a size (indicated by, for example, an area size as described layer), a color difference, or the like, of the discolored area 511. The color difference is, for example, a difference between the color of the discolored area 511 and the color of a peripheral area 513 outside the discolored area 511 (hereinafter, such a color will be referred to as a peripheral area color).

The image processing apparatus 100 determines whether the detected color difference or luminance difference is greater than or equal to a threshold value (details thereof will be described later). In a case where the color difference is greater than or equal to the threshold value, the image processing apparatus 100 determines that the discolored area 511 is an area to be covered with a sheet, that is, a cover area. On the other hand, in a case where the color difference is smaller than the threshold value, the image processing apparatus 100 determines that the discolored area 511 is an area that is not to be covered with a sheet, that is, a non-cover area.

In a case where it is determined that the discolored area 511 is a cover area, the image processing apparatus 100 generates image data based on the shape and the size of the discolored area 511 and the peripheral area color, and outputs the generated image data to the printing apparatus 400. For example, the image data has a content according to which a coloring material of a color identical (or similar) to the peripheral area color is to be printed to a specified side of the sheet 520 capable of being stuck to a skin such that the coloring material is printed in an area with the same shape and the same size of the discolored area 511.

The printing apparatus 400 prints an image 521 on the sheet 520 based on the image data received from the image processing apparatus 100. For example, the shape and the size of the image 521 are identical to those of the discolored area 511 determined as the cover area. For example, the printing on the sheet 520 by the printing apparatus 400 is performed in a state in which the sheet 520 is removably stuck to a supporting element (backing paper). The printing apparatus 400 then outputs the sheet 520.

The user 600 sticks the sheet 520, output from the printing apparatus 400, to a skin 531 such that the discolored area 511 is covered by the printed image 521. As a result, a skin area 532 is covered by the image 521 with the same (or similar) color as the peripheral area color, and the discolored area 511 becomes further inconspicuous.

That is, the makeup assist system 1 is capable of making up such that the color of the skin 531 is uniformed simply by sticking the sheet 520 to the skin 531, which can be performed in a short time.

In the above explanation, it is assumed by way of example but not limitation that the shape and the size of the image 521 are identical to the shape and the size of the discolored area 511 determined as the cover area. For example, the image 521 may have a size including the whole discolored area 511 (for example, a size slightly larger than the size of the discolored area 511). In this case, the coloring material may be printed such that a gradation (blurring around the image 521) is formed. The forming of the gradation makes it possible to hide the discolored area 511 when the sheet 520 is stuck to the skin 531 even if a slight shift occurs between the discolored area 511 and the image 521, without causing the skin 531 to look unnatural.

Configuration of Apparatus

Figure 2:
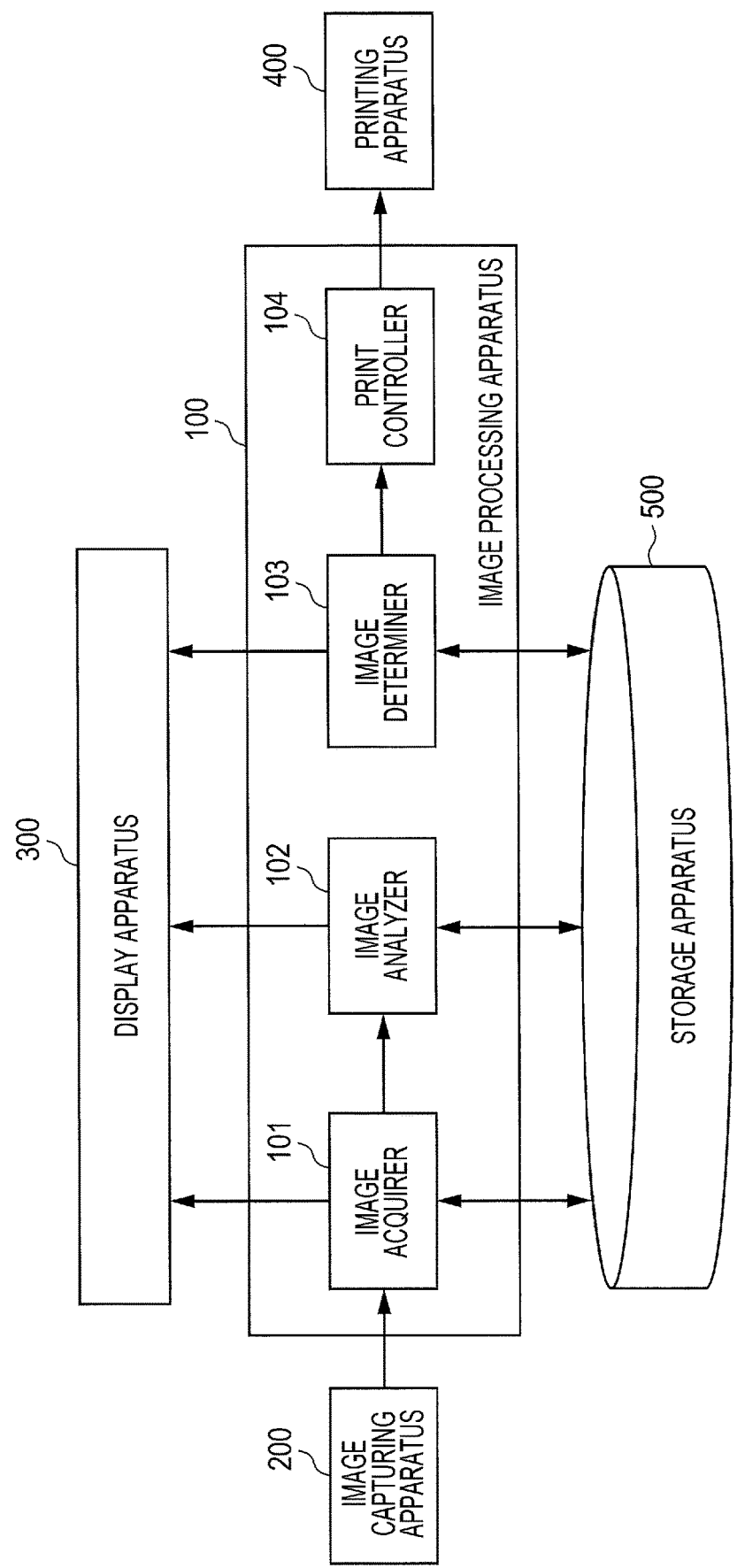
FIG. 2 is a block diagram illustrating an example of an image processing apparatus according to the present disclosure.

Next, referring to FIG. 2, a configuration of the image processing apparatus 100 is explained.

FIG. 2 is a block diagram illustrating an example of a configuration of the image processing apparatus 100.

The image processing apparatus 100 illustrated in FIG. 2 may be a stationary type apparatus or a portable type apparatus that can be easily carried.

The storage apparatus 500 illustrated in FIG. 2 is installed, for example, in a server apparatus on a network, and stores various kinds of information (for example, discolored area information, a threshold value, a predetermined value, and/or the like described later) for each user. Alternatively, the storage apparatus 500 may be installed in the image processing apparatus 100.

In FIG. 2, the image processing apparatus 100 includes an image acquirer 101, an image analyzer 102, an image determiner 103, and a print controller 104. Although not illustrated in the figure, the image processing apparatus 100 includes, for example, a CPU (Central Processing Unit), a storage medium such as a ROM (Read Only Memory) or the like storing a control program, a working memory such as a RAM (Random Access Memory) or the like, and a communication circuit. In this configuration, the function of each unit illustrated in FIG. 2 is realized by executing the control program by the CPU.

The image acquirer 101 acquires a face image from the image capturing apparatus 200 and stores this face image in the storage apparatus 500 in association with user identification information and image capture date information, and also outputs it to the image analyzer 102. The user identification information is information identifying a user of the captured image of the face. The image capture date information is information indicating a date (which may include year, month, and time) on which the image of the face is taken. These pieces of information may be associated with another image, other than a face image, captured by the image capturing apparatus 200. For example, the image may be of a back of a hand or an arm skin.

The image acquirer 101 acquires a face image from the storage apparatus 500 at a predetermined timing and displays the face image on the display apparatus 300 (see FIG. 4 which will be described later).

When the image analyzer 102 receives the face image from the image acquirer 101, the image analyzer 102 extracts face parts (for example, cheeks, a nose, a forehead, a chin and/or the like) from the face image, and extracts a skin image from the face image based on locations of the extracted face parts on the face image. The image analyzer 102 then extracts a discolored area from the skin image. The discolored area extracted here may include not only an area where discoloration apparently occurs on the surface of the skin but may also include an area latent below the surface of the skin (such as a hidden spot). A hidden spot may be extracted, for example, by capturing an image of a face while illuminating a face with light with different wavelengths and extracting the hidden spot based on the captured image.

In the present embodiment, a discolored area to be extracted may occur due to various different causes. That is, discolored areas may be classified according to their causes of discoloration (hereinafter referred to as "cause types") as follows: a pigment spot; a chloasma; a nevus spilus; a melanocytic nevi; a nevus of Ota; acquired dermal melanocytosis; an erythema; a purpura; an achromoderma; a bruise; a lentigo; a darkened pore; a sunburned area, acne; an acne scar; pigmentation due to friction or inflammation; a wrinkle, a freckle; a tattoo; a verruca; cicatrix; etc. A treatment to be performed on the discolored area is different depending on the cause type.

The image analyzer 102 extracts coordinates, an area size, a color difference, and a color of peripheral area outside each extracted discolored area.

The coordinates extracted by the image analyzer 102 are, for example, coordinates in a face coordinate system defined with respect to a plurality of face feature points. The coordinates may be represented in either a two-dimensional coordinate system or a three-dimensional coordinate system. In the present embodiment, by way of example, the coordinates are represented in the two-dimensional coordinate system. The coordinates extracted here may indicate one point corresponding to a barycenter of a discolored area or a plurality of points capable of determining the shape of the discolored area.

The image analyzer 102 then stores the information in terms of the coordinates, the area size, the color difference, and the peripheral area color (hereinafter collectively referred to as "discolored area information") in association in the storage apparatus 500. For example, the discolored area information is stored in association with a face image from which the discolored area is extracted.

The image analyzer 102 reads a face image and discolored area information from the storage apparatus 500 at a predetermined timing, and displays the face image and the discolored area on the display apparatus 300 (see FIG. 6 which will be described later).

The image determiner 103 acquires, from the storage apparatus 500 and at a predetermined timing, discolored area information extracted from a face image captured at a first timing (for example, one month ago) and discolored area information extracted from a face image captured at a second timing (for example, at present time) later than the first timing.

Hereinafter, the face image captured at the first timing is referred to as a "first face image", a skin image included in the first face image is referred to as a "first skin image", a discolored area extracted from the first skin image is referred to as a "first discolored area", and information in terms of coordinates, an area size, a color difference, and a color of peripheral area outside the first discolored area is referred to as "first discolored area information". Note that in a case where the first discolored area indicated in the first discolored area information was determined as a cover area in the past (before the second timing, for example, at the first timing), the first discolored area information includes determination history information indicating this fact.

Furthermore, hereinafter, a face image captured at the second timing is referred to as a "second face image", a skin image included in the second face image is referred to as a "second skin image", a discolored area extracted from the second skin image is referred to as a "second discolored area", and information in terms of coordinates, an area size, a color difference, and a color of a peripheral area outside the second discolored area is referred to as "second discolored area information". Note that in a case where the second discolored area indicated in the second discolored area information was determined as a cover area in the past, the second discolored area information includes determination history information indicating this fact.

The image determiner 103 acquires a threshold value from the storage apparatus 500. The threshold value is a color difference value (or a luminance difference) according to which a discolored area is classified into either a cover area or a non-cover area. The threshold value is calculated, for example, based on a color difference and an area size of a discolored area determined in the past as a cover area according to a selection made by a user. The calculation of the threshold value may be performed by the image determiner 103 or a not-illustrated threshold value calculator.

The image determiner 103 determines, based on the coordinate information and the determination history information included in the first discolored area information and the coordinate information included in the second discolored area information, whether in the second discolored area, there exists an area (hereinafter referred to as a "corresponding area") corresponding to a first discolored area determined as a cover area in the past. For example, in a case where the coordinates of the second discolored area are identical to the coordinates of the first discolored area and the first discolored area was determined as a cover area in the past, the second discolored area can be said to be a corresponding area.

In a case where there is a corresponding area, the image determiner 103 determines whether a predetermined condition (described in detail later) is satisfied for this corresponding area. In a case where the predetermined condition is satisfied, the image determiner 103 makes an adjustment such that the threshold value is reduced by a predetermined value. On the other hand, in a case where the predetermined condition is not satisfied, the image determiner 103 does not adjust the threshold value.

The image determiner 103 then classifies the second discolored area into either a cover area or a non-cover area by using the threshold value. More specifically, in a case where the color difference of the second discolored area is larger than or equal to the threshold value, the image determiner 103 determines that this second discolored area is a cover area. On the other hand, in a case where the color difference of the second discolored area is smaller than the threshold value, the image determiner 103 determines that this second discolored area is a non-cover area.

Note that even in a case where the color difference of the second discolored area is smaller than the threshold value, if the area size is greater than a particular value (for example, in a case where a spot has a large size and thus it is conspicuous although its color is light) then the image determiner 103 may determine this second discolored area as a cover area.

Furthermore, even in a case where the color difference is larger than the threshold value, if the area size is smaller than a predetermined value, then the image determiner 103 may determine that the second discolored area (for example, a spot having a small size which is not conspicuous although its color is dark) is a non-cover area. Even in a case where the color difference of the second discolored area is greater than the threshold value, if the second discolored area has a deformed shape different from a usual shape (for example, a usual spot shape such as a circle, an ellipse, or the like), there is a possibility that the second discolored area is a foreign matter adhered to the face surface or a reflection of an unnecessary object, and thus the image determiner 103 may determine that the second discolored area is a non-cover area.

The image determiner 103 then displays the second discolored area on the display apparatus 300 such that a user can understand whether the second discolored area is a cover area or a non-cover area (see FIG. 8 which will be described later).

Figure 8:
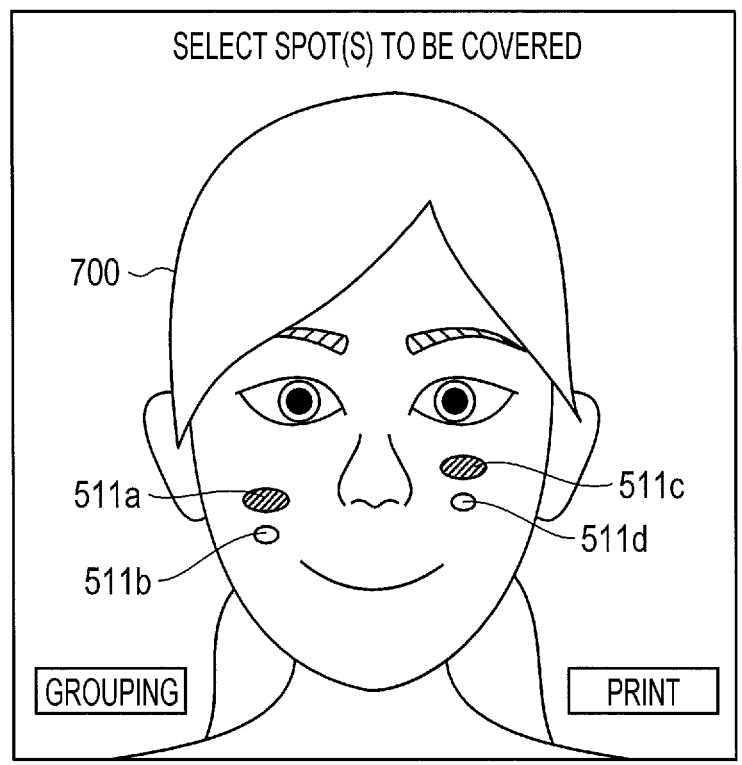
FIG. 8 is a diagram illustrating an example of a screen displayed in a classification result display process according to the present disclosure.

Herein, in a case where the user agrees with the determination result (in other words, the classification result) made by the image determiner 103, the user performs an agreement operation (for example, the user operates a "print" button illustrated in FIG. 8).

On the other hand, in a case where the user wants to change the determination result made by the image determiner 103, the user may perform a change operation. For example, the user may select a second discolored area determined as a cover area thereby changing the determination result for this second discolored area to a non-cover area. On the other hand, the user may select a second discolored area determined as a non-cover area thereby changing the determination result for this second discolored area to a cover area. After performing such a change operation, the user performs the agreement operation.

Herein, a selected discolored area and a not selected discolored area may be displayed in different manners. For example, a discolored area in a non-selected state may be displayed such that a contour is displayed by a broken line or the like and the inside thereof is not filled. This makes it possible for the user to easily understand the state of the discolored part. Alternatively, when a discolored area is in a selected state, a transparency of a mask (superimposed) image indicating the selected area may be reduced to indicate that this discolored area is in the selected state, while when a discolored area is in a non-selected state, a transparency of a mask image may be increased such that states of discolored parts are easily recognized. The transparency may be changed in an opposite manner according to a specification by a user. An instruction to switch the displayed/non-displayed state of the mask image may be accepted from the user.

When the agreement operation is performed, the image determiner 103 determines, as the cover area, the second discolored area determined as the cover area or the second discolored area changed to the cover area by the change operation.

Furthermore, the image determiner 103 determines a color of a coloring material to be printed on the sheet (hereinafter, referred to as a "print color") based on the peripheral area color information included in the second discolored area information. For example, the image determiner 103 may determine the color of the peripheral area outside the second discolored area as the print color. Alternatively, for example, in a case where a plurality of second discolored areas exist, the image determiner 103 may calculate the average values in terms of luminance, saturation, and hue for each peripheral area color and may determine the print color based on the calculation result.

The image determiner 103 then outputs determination result information indicating the shape (for example, coordinate information), the size (for example, area size information), and the print color of the second discolored area determined as the cover area to the print controller 104.

The print controller 104 generates image data (for example, data in the CMYK format) for use in printing the image on the sheet based on the determination result information, and outputs the generated image data to the printing apparatus 400 via wireless communication and/or wireless communication or the like. The image data has a content according to which to print the coloring material on the sheet over an area with the same shape and the same size as the shape and the size of the second discolored area determined as the cover area.

Note that the print controller 104 does not necessarily need to transmit the generated image data directly to the printing apparatus 400, but the print controller 104 may transmit it indirectly via another information storage device or the like. For example, the print controller 104 may store the generated image data in a storage medium such as a portable memory device or may transmit the generated image data to a portable device (a smartphone, a tablet device, a PC, or the like). In this case, the user transmits the image data to the printing apparatus 400 via the storage medium or the portable device described above, and printing is performed as required in accordance to an instruction given by the user.

As described above, in the image processing apparatus 100 according to the present embodiment, in a case where in the second discolored area extracted from the second skin image, there exists an area (corresponding area) corresponding to the first discolored area determined as the cover area in the past, if a predetermined condition is satisfied, the threshold value is adjusted such that the threshold value is reduced, but if the predetermined condition is not satisfied, the adjustment of the threshold value is not performed. The image processing apparatus 100 then makes a determination such that when the color difference of the second discolored area is greater than or equal to the threshold value, the image processing apparatus 100 determines that the second discolored area is a cover area, while when the color difference of the second discolored area is smaller than the threshold value, the image processing apparatus 100 determines that the second discolored area is a non-cover area. Thus, even when the second discolored area, which has been determined as a cover area in the past, has now so small a color difference that the second discolored area may not be determined as a cover area, it is possible to determine that this second discolored area is a cover area.

Thus, by sticking the sheet, on which the image having the same shape and the size as the shape and the size of the second discolored area determined as the cover area was printed, to an affected part, it is possible to continuously and easily take care of the affected part such that an external stimulus is reduced. As a result, an improvement in recovery of the skin in the affected part is achieved.

Operation of Apparatus

Next, an operation of the image processing apparatus 100 is described.

Figure 3:
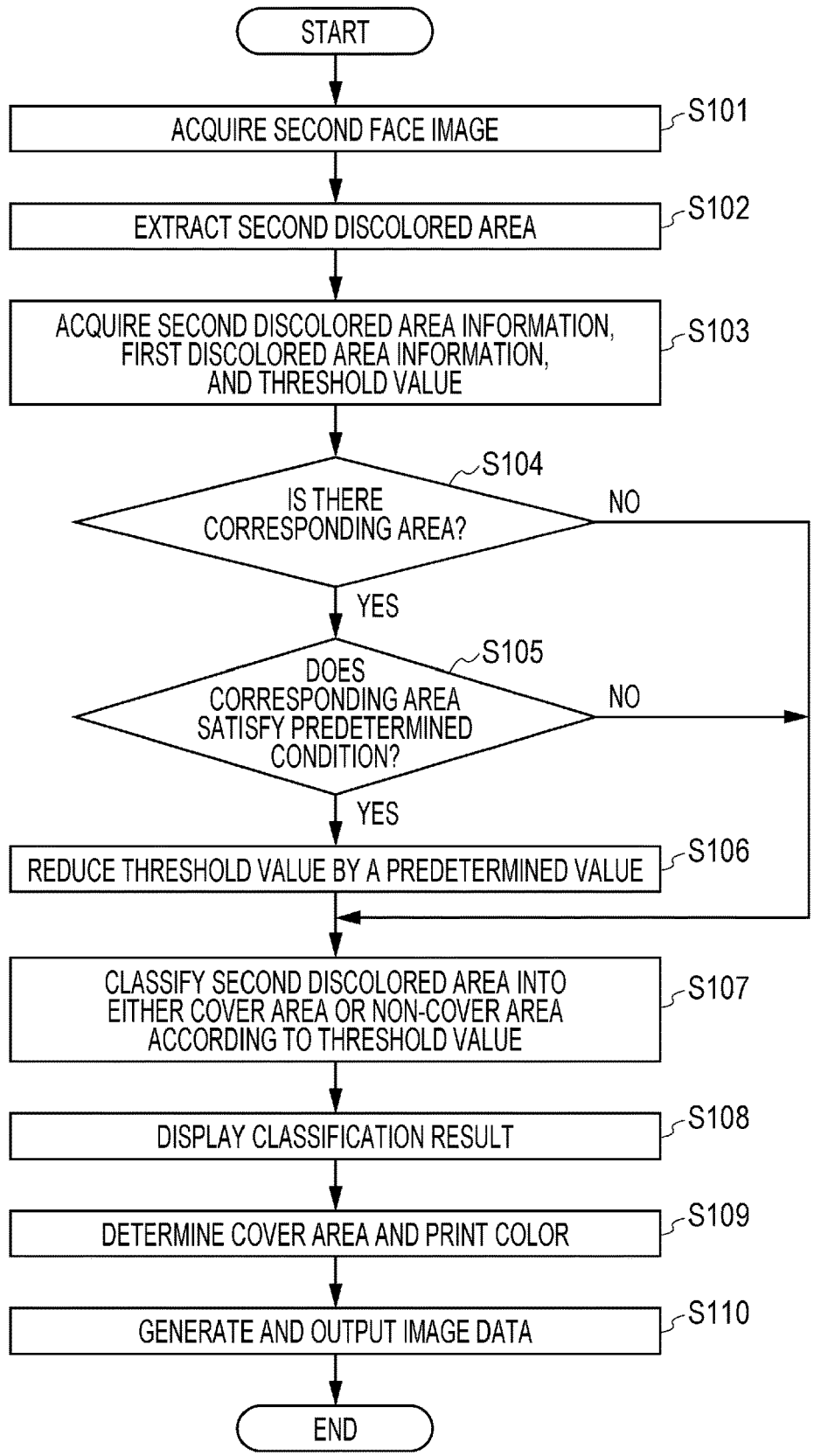
FIG. 3 is a flow chart illustrating an example of an overall operation of an image processing apparatus according to the present disclosure.

FIG. 3 is a flow chart illustrating an example of an operation of the image processing apparatus 100.

In the following explanation, it is assumed by way of example that the storage apparatus 500 stores a first face image (a first skin image) obtained by capturing an image of a face of a certain user one month ago (an example of the first timing) and first discolored area information associated with the first face image, and an image of the face of the same user is captured at the present time (an example of the second timing).

In step S101, the image acquirer 101 acquires the second face image from the image capturing apparatus 200. The image acquirer 101 then stores the second face image and image capture date information thereof in the storage apparatus 500 in association with user identification information associated with the first face image.

Furthermore, the image acquirer 101 displays the second face image and the image capture date information thereof on the display apparatus 300. In this process, the image acquirer 101 may acquire the first face image and the image capture date information thereof from the storage apparatus 500 and may also display them on the display apparatus 300.

Figures 4, 5:
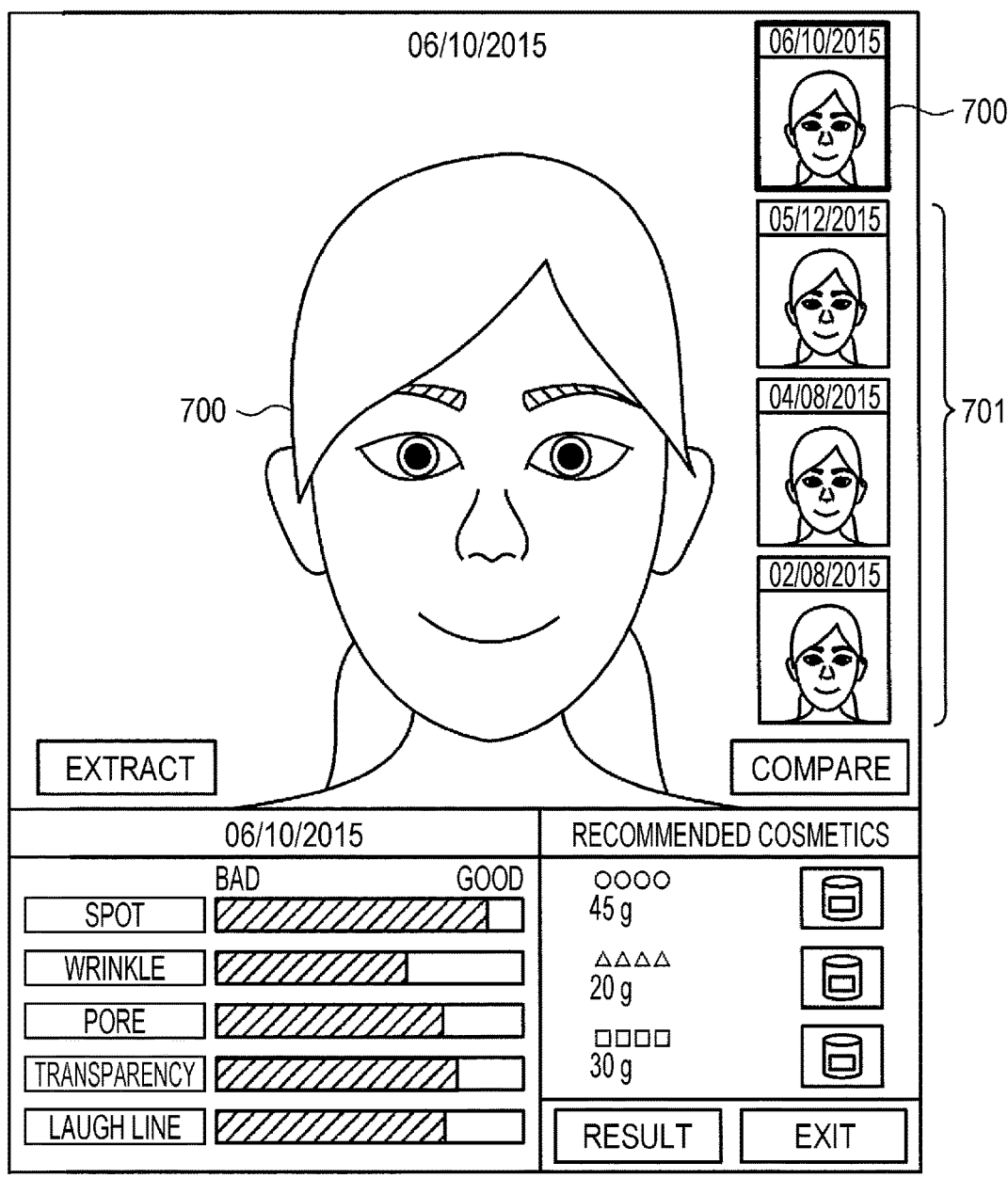
FIG. 4 is a diagram illustrating an example of a screen displayed in an image acquisition process according to the present disclosure.
FIG. 5 is a diagram illustrating an example of discolored area information according to the present disclosure.

FIG. 4 illustrates an example of a manner of displaying face images in this situation. As illustrated in FIG. 4, a second face image 700 selected by a user is displayed in large size in the center of a screen. At locations adjacent to the second face image 700, thumbnails of the second face image 700 and a plurality of first face images 701 are displayed in a selectable manner. If a user performs an operation to select a desired one from the thumbnails of face images, the selected face image is displayed in a large size in the center of the screen. The date of capturing the image is displayed above each of the second face image 700 and the plurality of first face images 701.

Furthermore, as illustrated in FIG. 4, a skin diagnosis result is displayed in a lower left area of the screen, and recommended cosmetics are displayed in a lower right area of the screen. Information about the recommended cosmetics includes, for example, a name, a product number, a manufacturer name, or the like, of a cosmetic selected depending on the skin diagnosis result described below. The skin diagnosis result includes, for example, information indicating a state of a skin obtained by analyzing the second face image 700 by the image analyzer 102. In the example illustrated in FIG. 4, states in terms of a spot, a winkle, a pore, a transparency, and a laugh line are displayed. In this situation, if a user performs an operation to select, for example, winkle, an image indicating a location of the winkle (the location detected by the image analyzer 102) may be displayed such that the location is superimposed on the second face image 700. This makes it possible for the user to visually understand the skin state other than spots obtained by image analysis.

In a case where the skin state other than the spots (for example, a winkle, a laugh line, or the like) detected by the image analyzer 102, is selected by a user, an active ingredient for improving the selected skin state may be printed on the sheet. For example, in a case where the winkle is selected by the user on the screen shown in FIG. 4, the image determiner 103 may generate image data with a content for printing an active ingredient (for example, a moisturizing ingredient or the like) in the same shape and the same size on the sheet as the shape and the size of the winkle detected by the image analyzer 102, and the image determiner 103 may output the resultant image data to the printing apparatus 400. Based on this image data, the printing apparatus 400 prints, using the active ingredient, an image with the shape and the size of the winkle on the sheet and outputs the sheet. This makes it possible to take care by sticking the sheet also for skin states other than the discolored area.

In a case, for example, in a state in which the second face image 700 is selected, if the user operates an "extraction" button shown in FIG. 4, the second face image 700 is output from the image acquirer 101 to the image analyzer 102. The image analyzer 102 performs a process to extract a discolored area from the second face image 700. Note that also in a case where the "extraction" button is operated in a state in which one of the plurality of first face images 701 is selected, the selected first face image 701 is output from the image acquirer 101 to the image analyzer 102, and the image analyzer 102 executes the process to extract a discolored area from the selected first face image 701.

In step S102, the image analyzer 102 extracts a second skin image from the second face image received from the image acquirer 101, and extracts a second discolored area from the second skin image. The image analyzer 102 then extracts coordinates, an area size, a color difference, and a peripheral area color from each extracted second discolored area and stores second discolored area information indicating the extracted values in the storage apparatus 500 in association with the second face image.

FIG. 5 illustrates an example of second discolored area information stored in the storage apparatus 500. The second discolored area information illustrated in FIG. 5 is an example for a case where four second discolored areas are extracted from the second face image. As illustrated in FIG. 5, coordinate information, area size information, and color difference information are associated to each second discolored area. Although not illustrated in the figure, the peripheral area color information is also associated with the coordinate information, the area size information, and the color difference information. Although in the example illustrated in FIG. 5, only one pair of coordinates is shown for one second discolored area, a plurality of pairs of coordinates may be associated with one second discolored area. Also in the first discolored area information, the coordinate information, the area size information, the color difference information, and the peripheral area color information are associated to each first discolored area in a similar manner as shown in FIG. 5. The first discolored area information may include determination history information.

Furthermore, the image analyzer 102 displays the second face image and the discolored area extracted from the second face image on the display apparatus 300.

Figure 6:
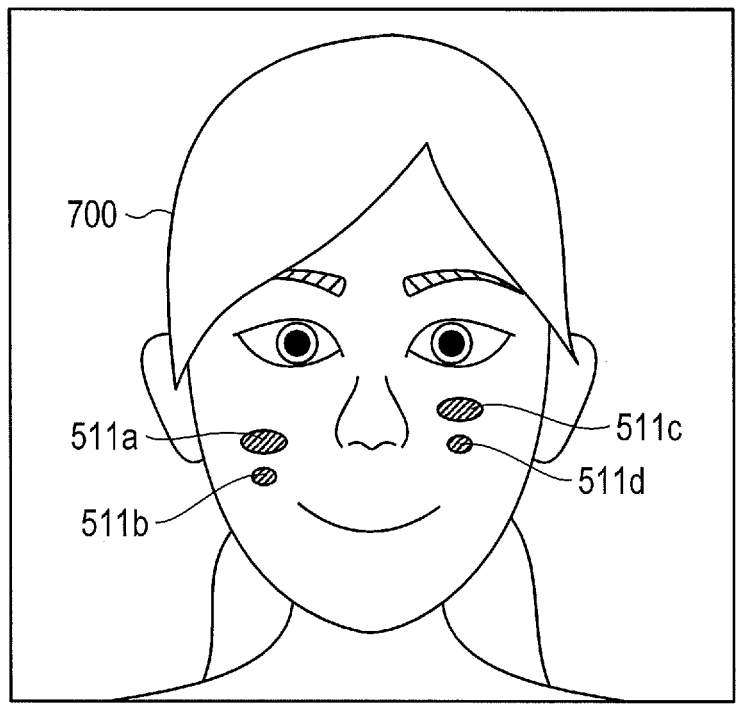
FIG. 6 is a diagram illustrating an example of a screen displayed in a discolored area extraction process according to the present disclosure.

An example of a face image displayed in this situation is illustrated in FIG. 6. In this displaying, as shown in FIG. 6, second discolored areas 511a, 511b, 511c, and 511d are superimposed on the second face image 700. The second discolored areas 511a to 511d are for example, four second discolored areas represented by the second discolored area information shown in FIG. 5. The second discolored areas 511a to 511d may include not only a second discolored area appearing apparently on the surface of a skin but also a second discolored area latent below the surface of the skin (such as a hidden spot).

In step S103, the image determiner 103 acquires the second discolored area information, the first discolored area information, and the threshold value from the storage apparatus 500.

Figure 7:
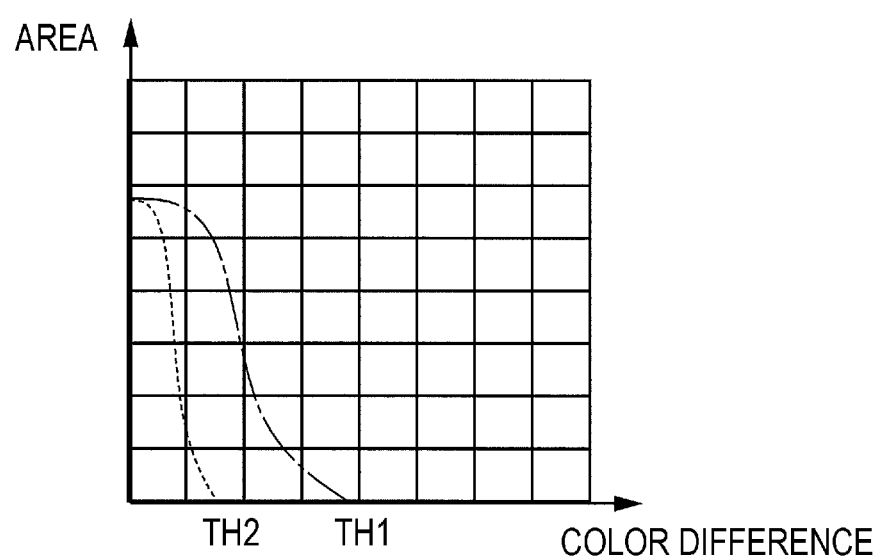
FIG. 7 is a diagram illustrating an example of a threshold value according to the present disclosure.

An example of a threshold value is shown in FIG. 7. In FIG. 7, TH1 denotes a threshold value acquired in step S103, while TH2 denotes a threshold value adjusted in step S107 as described later. More specifically, TH1 is an approximation curve determined based on points (not shown in the figure) plotted for color differences of discolored areas determined by the image determiner 103 as cover areas in the past (the discolored areas include discolored areas selected by a user as cover areas) and area sizes. Note that each time a discolored area is determined as a cover area, the color difference and the area size of the discolored area may be learned and the threshold value may be adjusted as required based on a learning result.

In step S104, the image determiner 103 makes a determination, based on the coordinate information and the determination history information included in the first discolored area information and the coordinate information included in the second discolored area information, as to whether in the second discolored areas extracted in step S102, there exists an area (a corresponding area) corresponding to the first discolored area determined as the cover area in the past.

In a case where the determination result in step S104 indicates that there is no corresponding area (NO in step S104), the processing flow proceeds to step S107 (details thereof will be described later). On the other hand, in a case where the determination result in step S104 indicates that there is a corresponding area (YES in step S104), the processing flow proceeds to step S105.

In step S105, the image determiner 103 determines whether a predetermined condition is satisfied for the corresponding area.

For example, the predetermined condition is that the corresponding area is an area that has been subjected to a treatment (for example, a laser treatment to remove a spot) in the past. In this case, for example, the image determiner 103 acquires treatment history information (which is an example of user-related information described later in sixth modification) from the storage apparatus 500, and if the treatment history information indicates that the corresponding area is an area which has been subjected to a treatment in the past, the image determiner 103 determines that the predetermined condition is satisfied. The treatment history information is, for example, information indicating a date on which the treatment was performed, coordinates and a size of the area subjected to the treatment, and/or the like.

Another specific example of the predetermined condition is that a rate of change calculated based on a color difference of the corresponding area and a color difference of a first discolored area corresponding to the corresponding area is greater than or equal to a predetermined value. In this case, the image determiner 103 calculates the rate of change of the color difference based on color difference information included in the second discolored area information and color difference information included in the first discolored area information, and if the calculated rate of change is greater than or equal to the predetermined value, the image determiner 103 determines that the predetermined condition is satisfied.

Still another specific example of the predetermined condition is that the rate of change calculated based on the color difference of the corresponding area and the color difference of the first discolored area corresponding to the corresponding area is smaller than a predetermined value. In this case, the image determiner 103 calculates the rate of change of the color difference based on color difference information included in the second discolored area information and color difference information included in the first discolored area information, and if the calculated rate of change is smaller than the predetermined value, the image determiner 103 determines that the predetermined condition is satisfied.

Still another specific example of the predetermined condition is that a rate of change calculated based on a size of the corresponding area and a size of a first discolored area corresponding to the corresponding area is greater than or equal to a predetermined value. In this case, the image determiner 103 calculates the rate of change of the area size based on area size information included in the second discolored area information and area size information included in the first discolored area information, and if the calculated rate of change is greater than or equal to the predetermined value, the image determiner 103 determines that the predetermined condition is satisfied.

Still another specific example of the predetermined condition is that a rate of change calculated based on a size of the corresponding area and a size of a first discolored area corresponding to the corresponding area is smaller than a predetermined value. In this case, the image determiner 103 calculates the rate of change of the area size based on area size information included in the second discolored area information and area size information included in the first discolored area information, and if the calculated rate of change is smaller than the predetermined value, the image determiner 103 determines that the predetermined condition is satisfied.

Still another specific example of the predetermined condition is that the color difference of the first discolored area corresponding to the corresponding area is greater than a predetermined value. In this case, if the color difference information included in the first discolored area information indicates that the color difference is greater than the predetermined value, the image determiner 103 determines that the predetermined condition is satisfied. The predetermined value here is, for example, a value of the color difference that allows a human to recognize the discolored area.

Still another specific example of the predetermined condition is that the size of the first discolored area corresponding to the corresponding area is greater than a predetermined value. In this case, if the area size information included in the first discolored area information indicates that the area size is greater than the predetermined value, the image determiner 103 determines that the predetermined condition is satisfied. The predetermined value here is, for example, a value of the area size that allows a human to recognize the discolored area.

The examples of the predetermined conditions described above may be combined in a proper manner. For example, in a case where the condition that "the corresponding area is an area which has been subjected to a treatment in the past" is not satisfied, a further determination may be made as to whether a condition that "the rate of change calculated based on the color difference (or the size) of the corresponding area and the color difference (of the size) of the first discolored area corresponding to the corresponding area is greater than or equal to the predetermined value" is satisfied. When this condition is also unsatisfied, a further determination may be made as to whether a condition that "the color difference of the first discolored area corresponding to the corresponding area is greater than or equal to a predetermined value" is satisfied.

In a case where the determination result in step S105 indicates that the predetermined condition is not satisfied (NO in step S105), the processing flow proceeds to step S107 (which will be described in detail later). On the other hand, in a case where the determination result in step S105 indicates that the predetermined condition is satisfied, (YES in step S105), the processing flow proceeds to step S107.

In step S106, the image determiner 103 makes an adjustment such that the threshold value is reduced by a predetermined value. For example, the threshold value is changed from the threshold value TH1 shown in FIG. 7 to the threshold value TH2.

In step S107, based on the second discolored area information and the threshold value (subjected or not subjected to the adjustment), the image determiner 103 classifies the second discolored area extracted in step S102 into either a cover area or a non-cover area.

In step S108, the image determiner 103 displays the second discolored area on the display apparatus 300 such that a user can understand the classification result in step S107, that is, whether the second discolored area is a cover area or a non-cover area.

An example of a face image displayed in this situation is illustrated in FIG. 8. In this displaying, as shown in FIG. 8, second discolored areas 511a, 511b, 511c, and 511d are superimposed on the second face image 700. For example, in a case where it is determined that the second discolored areas 511a and 511c are cover areas, the second discolored areas 511a and 511c are displayed such that the inside of each of the second discolored areas 511a and 511c is filled (hereinafter, this display mode will be referred to as a filled mode). On the other hand, in a case where the second discolored areas 511b and 511d are determined as non-cover areas, the second discolored areas 511b and 511d are displayed such that the inside thereof is not filled (hereinafter this display mode will be referred to as a non-filled mode). By displaying the second discolored area in the filled mode or non-filled mode, it becomes possible for a user to understand whether the second discolored area is a cover area or a non-cover area.

When the face image is displayed as in FIG. 8, if a user agrees with the classification result made by the image determiner 103, that is, if the user agrees with the determination that the second discolored areas 511a and 511c are determined as cover areas and the second discolored areas 511b and 511d are determined as non-cover areas, the user operates the "print" button shown in FIG. 8 (this operation is an example of the agreement operation).

When the displaying is performed as shown in FIG. 8, the user is allowed to perform a change operation to change the classification result made by the image determiner 103. For example, in a case where the user wants to change the classification for the second discolored area 511a from the cover area to a non-cover area, the user performs an operation to select the second discolored area 511a. As a result, the second discolored area 511a is changed to the non-cover area and thus it is displayed in the non-filled mode. On the other hand, for example, when the user wants to change the classification for the second discolored area 511b classified as the non-cover area to the cover area, the user performs an operation to select the second discolored area 511b. As a result, the second discolored area 511b is changed to the cover area and thus it is displayed in the filled mode. After the user performs the change operation, the user operates the "print" button shown in FIG. 8 (an example of the agreement operation).

If the agreement operation is performed, then in step S109, the image determiner 103 determines the second discolored area displayed in the filled mode (the second discolored area determined by the image determiner 103 as a cover area, or the second discolored area changed to a cover area by the change operation) as a cover area.

Furthermore, the image determiner 103 updates the second discolored area information of the second discolored area determined as the cover area such that determination history information indicating that the second discolored area is determined as the cover area is included in the second discolored area information, and the image determiner 103 stores the updated second discolored area information in the storage apparatus 500.

In step S109, the image determiner 103 also determines a print color to be used in printing the determined cover area. The skin color may change with time. Therefore, to make the sheet look more natural when the sheet is struck to the skin, the determination of the print color is performed such that a color of a peripheral area outside the second discolored area may be employed. For example, in a case where second discolored areas 511a and 511c shown in FIG. 8 are determined as cover areas, the image determiner 103 calculates the average values in terms of luminance, saturation, and hue based on the peripheral area color information associated with the second discolored areas 511a and 511c, and the image determiner 103 determines the print color based on the calculation result.

The image determiner 103 then outputs determination result information indicating the shape, the size, and the print color of the second discolored area determined as the cover area to the print controller 104.

Note that in the example described above, it is assumed by way of example but not limitation that the determination result information includes information indicating the shape and the size of the second discolored area determined as the cover area. Alternatively, for example, the image determiner 103 may define an inclusion area including the whole second discolored area determined as the cover area, and may output determination result information indicating a shape, a size, and a print color of the inclusion area to the printing apparatus 400.

Figure 9:
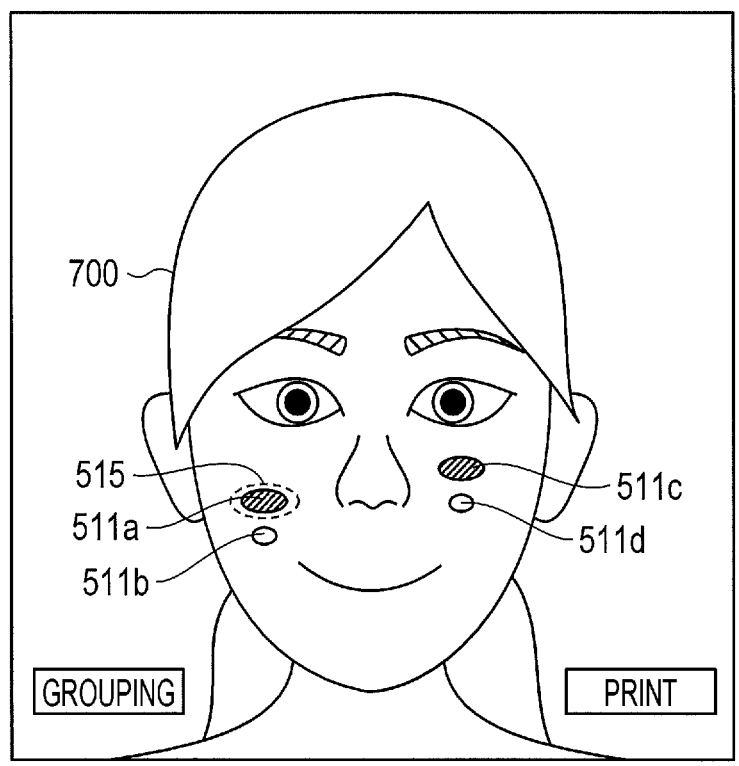
FIG. 9 is a diagram illustrating an example of an inclusion area according to the present disclosure.

FIG. 9 illustrates an example of an inclusion area. For example, in a case where the second discolored area 511a is determined as a cover area, the image determiner 103 defines an inclusion area 515 including the second discolored area 511a. The image determiner 103 then outputs determination result information indicating a shape, a size, and a print color of the inclusion area 515 to the printing apparatus 400. Note that the inclusion area 515 may be displayed such that it is superimposed on the second face image 700.

In step S110, the print controller 104 generates image data for use in printing an image on a sheet based on the determination result information received from the image determiner 103, and outputs the generated image data to the printing apparatus 400. The image data has a content that allows it to form, on a sheet, an image with the same shape and the same size as the shape and the size of the second discolored area determined as the cover area (or the inclusion area described above) when a coloring material of the determined print color is printed on the sheet according to the image data. That is, the image formed on the sheet has the same shape and the same size as the shape and the size of the second discolored area determined as the cover area (or the inclusion area described above).

Note that the image data may include various kinds of information relating to the printing. For example, the image data may include information indicating the shape and the size of the image to be printed on the sheet, the type of the coloring material, the density of the coloring material, the specification as to whether blurring (gradation) is to be formed around the perimeter of the image, the types of face parts (for example, a cheek, a forehead, a nose, a chin, etc.) corresponding to the image, and/or the like.

Furthermore, for example, the image data may include information indicating a mark that allows a user to understand a position and/or direction where the sheet is to be stuck, a mark (for example, a numeral, a character, a figure, or the like) that allows the user to understand upward, downward, rightward, and leftward directions of the sheet, a guide line along which the sheet is to be manually cut into a particular size, automatic cutting machine operation information for use in cutting the sheet into a particular size using an automatic cutting machine, or the like.

Furthermore, for example, the image data may include information indicating the type of a treatment agent (an active ingredient), the density of the treatment agent, and/or the like. The treatment agent is different depending on the type of the cause of the discoloration of the discolored area and is used to enhance an improvement of the discolored area. Examples of treatment agents include an anti-inflammatory agent, a whitening agent, a UV absorbing agent, a UV scattering agent, a hydroquinone or similar agent, etc.

For example, in a case where a plurality of second discolored areas are determined as cover areas, the image data may include, for example, information indicating a printing method specifying whether each of the plurality of images is to be printed on a separate sheet or the plurality of images are to be printed all together on one sheet.

When printing apparatus 400 receives the image data from the print controller 104, the printing apparatus 400 operates as follows.

Based on the image data received from the image processing apparatus 100, the printing apparatus 400 prints an image on a sheet using a coloring material.

More specifically, the printing apparatus 400 applies a coloring material of a print color (or a color similar to the print color) to a specified side of a sheet such that the coloring material is coated over an area with the shape and the size corresponding to the shape and the size of the second discolored area determined as the cover area (or the inclusion area) thereby generating the sheet on which a coloring material layer is formed. In this process, one or more images may be printed on one sheet separately for each face part.

The printing apparatus 400 outputs the generated sheet to the outside of the printing apparatus 400. A user sticks the sheet to a skin such that the coloring material layer of the sheet comes to a location corresponding to a location of a discolored area of her/his skin (the second discolored area determined as the cover area).

The coloring material layer has the same or similar color as or to the color of the peripheral area outside the second discolored area determined as the cover area, and thus the second discolored area becomes inconspicuous. Furthermore, the coloring material layer protects the skin from an external stimulus such as friction.

That is, by sticking the sheet to the skin, which is a simple short-time operation, the user is allowed to put on makeup such that the skin color looks uniform while achieving care to reduce the external stimulus.

The printing apparatus 400 may also print, for example, a treatment agent in addition to a coloring material. In this case, for example, the printing apparatus 400 prints the treatment agent to a side of the sheet that is to come in direct contact with the skin (hereinafter, this side of the sheet will be referred to as a "skin side") such that the treatment agent is coated over an area with the same shape and the same size as the shape and the size of the second discolored area determined as the cover area (or the inclusion area). The printing apparatus 400 prints the coloring material to a side of the sheet opposite to the skin side (hereinafter, this side of the sheet will be referred to as an "outer side") such that the coloring material is coated over an area with the same shape and the same size as the shape and the size of the second discolored area determined as the cover area (or the inclusion area).

The sheet is a sheet that is biocompatibility and that does not result in an uncomfortable feeling when it is stuck to a human skin. More specifically, for example, the sheet is a thin film having a thickness in a range from 10 nm to 100000 nm and more preferably from 10 nm to 1000 nm and including a layer of, for example, polyglycolic acid, polylactic acid, polycaprolactone, polyethylene succinate, polyethylene terephthalate, polyesters typified by copolymers of monomers described above, polyethylene glycol, polyethers typified by polypropylene glycol, nylon, polyglutamic acid, polyaspartic acid, polyamides typified by salts with acids described above, pullulan, cellulose, starch, chitin, chitosan, algin acid, hyaluronic acid, polysaccharides typified by cornstarch or salts thereof, acrylic silicone, silicones typified by trimethylsiloxysilicate, alkyl acrylate, silicone acrylate, amide acrylate or acrylic acids typified by copolymers thereof, polyvinyl alcohol, polyurethane, polycarbonate, polyanhydride, polyethylene, polypropylene, or the like. More detailed information about thin films usable as the sheet can be found, for example, in Japanese Unexamined Patent Application Publication No. 2014-140978, and thus a further description thereof is omitted.

Information about a coloring material (ink) or the like used in the printing by the printing apparatus 400 may be found in, for example, Japanese Unexamined Patent Application Publication No. 3-157313, Japanese Unexamined Patent Application Publication No. 9-302294, and Japanese Unexamined Patent Application Publication No. 2012-203425, and thus a further description thereof is omitted.

Effects of the Present Embodiment

As described above, the image processing apparatus 100 according to the present embodiment is an image processing apparatus that generates image data for use in printing an image on a sheet stickable to a skin. The image processing apparatus 100 includes the image acquirer 101 that acquires a first skin image obtained by capturing an image of a skin at a first timing and a second skin image obtained by capturing an image of the skin at a second timing later than the first timing, the image analyzer 102 that determines a discolored area extracted from the first skin image as a first discolored area and extracts a skin color from the second skin image, the image determiner 103 that determines a cover area, to be covered by the sheet, in the second skin image based on the first discolored area and determines a color of the cover area based on the skin color, and the print controller 104 that generates image data with a content for printing an image of the determined cover area on the sheet by using a coloring material of the determined color.

Thus, even when the second discolored area, which has been determined as a cover area in the past, has now so small a color difference that the second discolored area may not be determined as a cover area, the image processing apparatus 100 according to the present embodiment is capable of determining that this second discolored area is a cover area.

Thus, by sticking a sheet, on which an image having the same shape and the size as the shape and the size of the second discolored area determined as the cover area is printed, to an affected part, it is possible to take care of the affected part continuously and easily such that an external stimulus is reduced. As a result, an improvement in recovery of the skin in the affected part is achieved.

MODIFICATIONS OF THE PRESENT EMBODIMENT

The embodiments of the present disclosure have been described above. However, the present disclosure is not limited to these embodiments, but various modifications are possible. Examples of modifications are described below.

First Modification

In the embodiments described above, it is assumed by way of example but not limitation that when the predetermined condition is satisfied, the threshold value is adjusted and the determination of the cover area is made according to the adjusted threshold value.

For example, if the image determiner 103 determines, based on the first discolored area information (for example, the coordinate information and the determination history information) and the second discolored area information (for example, the coordinate information), that the second discolored area is a corresponding area (that is, the second discolored area is an area corresponding to the first discolored area which has been determined in the past as a cover area), then the image determiner 103 may determine that this second discolored area is a cover area.

Second Modification

In the embodiments described above, it is assumed by way of example that the threshold value is calculated based on plotted points of color differences and area sizes of discolored areas which have been determined in the past as cover areas. However, the method of calculating the threshold value is not limited to this example. Other examples, first to third calculation examples, are described below.

First, the first calculation example is described. For example, the threshold value may be calculated based on plotted points of color differences and area sizes of discolored areas which have been determined in the past as cover areas according to a selection by other one or more users who are similar, for example, in an age, a gender, a residence area, and/or the like (an example of user-related information described later in sixth modification).

Next, the second calculation example is described. For example, the threshold value may be calculated such that the threshold value decreases as the UV index increases. Specific examples in this case are described below.

Figures 10, 11:
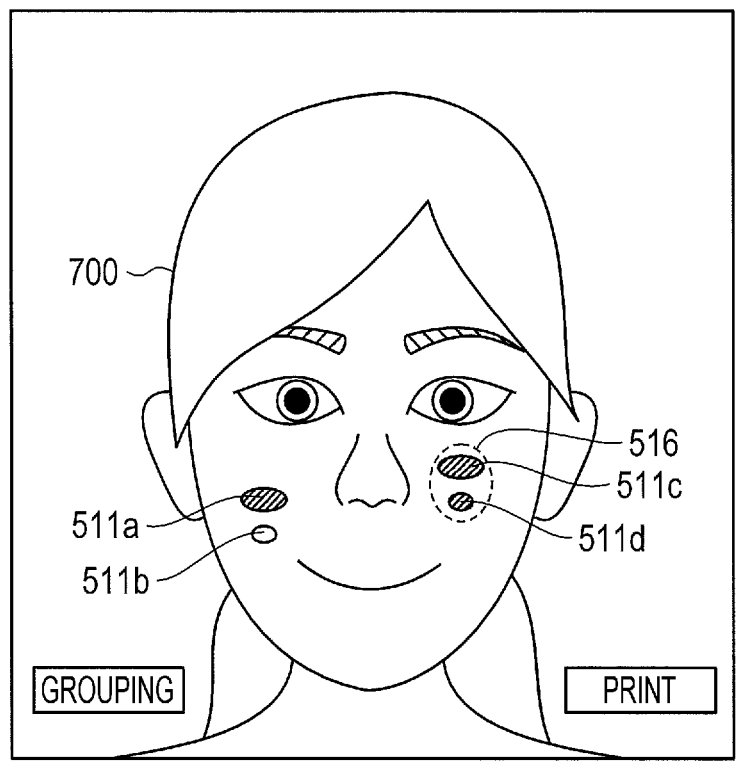
FIG. 10 is a diagram illustrating an example of a threshold value calculation table according to the present disclosure.
FIG. 11 is a diagram illustrating another example of an inclusion area according to the present disclosure.

First, the image processing apparatus 100 acquires a threshold value calculation table shown in FIG. 10 from the storage apparatus 500. As shown in FIG. 10, the threshold value calculation table describes coefficients that are for use in calculating the threshold value and decrease as the UV index increases.

Next, the image processing apparatus 100 acquires a UV index at the present point of time from a server apparatus (not shown in the figure) that provides UV indices. Alternatively, the UV index may be input by a user to the image processing apparatus 100.

Next, the image processing apparatus 100 refers to the threshold value calculation table and determines a coefficient corresponding to the UV index acquired from the server apparatus.

Next, the image processing apparatus 100 calculates the threshold value based on the color difference and the area size of the discolored area determined as a cover area in the past (hereinafter, this threshold value will be referred to as an initial threshold value) in a similar manner as described in the embodiments.

Next, the image processing apparatus 100 calculates the threshold value by multiplying the initial threshold value by the determined coefficient and performs the process in step S107 shown in FIG. 3 using the resultant threshold value.

By determining the threshold value such that the threshold value decreases as the strength of ultraviolet rays increases, it becomes possible to easily change a non-cover area to cover area, and thus it becomes possible to take care of a greater area.

In the threshold value calculation table, as shown in FIG. 10, the density of a UV-cutting ingredient (an example of an active ingredient) may be described in association with the UV index. The density of the UV-cutting ingredient is set such that the density increases as the UV index increases. After the image processing apparatus 100 determines the coefficient and the density of the UV-cutting ingredient, the image processing apparatus 100 generates image data such that the determined density of the UV-cutting ingredient is included in the image data. This makes it possible to achieve more effective UV protection.

Next, the third calculation example is described. For example, it is known that progesterone, which is secreted in large amounts before menstruation, causes a reduction in a skin barrier function and an increase in sebum secretion, and thus a large amount of secretion of progesterone can cause the skin to be more easily influenced by an external stimulus such as ultraviolet rays or the like than in a case where the skin is in a good state. In view of the above, the threshold value may be calculated to achieve more effective prevention of spots taking into account hormone balance. For example, the threshold value may be calculated such that the threshold value decreases as the amount of secretion of progesterone of a user increases. Specific examples in this case are described below.

First, the image processing apparatus 100 acquires a not-illustrated threshold value calculation table from the storage apparatus 500. This threshold value calculation table is set such that the coefficient for use in calculating the threshold value decreases as the basal body temperature increases. In general, the amount of secretion of progesterone increases as the basal body temperature increases.

Next, the image processing apparatus 100 acquires a basal body temperature from a measurement apparatus (not illustrated) that measures the basal body temperature of the user. Alternatively, the basal body temperature may be input by the user to the image processing apparatus 100.

Next, the image processing apparatus 100 refers to the threshold value calculation table and determines a coefficient corresponding to the basal body temperature acquired from the measurement apparatus.

Next, the image processing apparatus 100 calculates an initial threshold value based on the color difference and the area size of the discolored area determined as a cover area in the past in a similar manner as described in the embodiments.

Next, the image processing apparatus 100 calculates the threshold value by multiplying the initial threshold value by the determined coefficient and performs the process in step S107 shown in FIG. 3 using the resultant threshold value.

By calculating the threshold value such that the threshold value decreases as the amount of secretion of progesterone (as the basal body temperature increases) as described above, it becomes possible to easily change a non-cover area to cover area, and thus it becomes possible to take care of a greater area.

In the threshold value calculation table, the density of a UV-cutting ingredient (an example of an active ingredient) may be described in association with the basal body temperature. The density of the UV-cutting ingredient is set such that the density increases as the basal body temperature increases. After the image processing apparatus 100 determines the coefficient and the density of the UV-cutting ingredient, the image processing apparatus 100 generates image data such that the determined density of the UV-cutting ingredient is included in the image data. This makes it possible to achieve more effective UV protection.

The first to third calculation examples have been described above. Note that these first to third calculation examples may be combined in a proper manner.

Third Modification

In the embodiments described above, it is assumed by way of example that the print color is determined based on the color of the peripheral area outside the second discolored area. However, the method of determining the print color is not limited to this example.

For example, the print color may be determined based on a measurement value measured by a device such as a spectrophotometer or the like. Alternatively, for example, the print color may be determined based on a color selected by a user from color samples prepared in advance.

Alternatively, for example, the print color may be determined based on a color identified by a product number or the like of foundation, concealer, or the like used by a user (an example of user-related information described later in a sixth modification). An effect which may be obtained in this case is that the color will better fit a cosmetic used together with the sheet.

Alternatively, for example, the print color may be determined based on a color of an area (other than the second discolored area) selected by the user from the second skin image. In this case, for example, the user may select an area having a desired color, other than the second discolored areas 511*a* to 511*d*, in the face image 700 shown in FIG. 8.

For example, in a case where a second face image is captured in a bad circumstance (for example, in a circumstance in which lighting is dark), there is a possibility that the skin color of the second face image is different from an actual skin color. In view of the above, the image processing apparatus 100 may calculate an average color value (in terms of luminance, saturation, and hue) for particular areas (other than the first discolored area) in a plurality of first face images, and the image processing apparatus 100 may determine the print color based on the calculated average value. In this case, it is desirable that a first face image (for example, a face image browned by the sun) that is very different in color difference from the other first face images is not used in the calculation of the average value.

Fourth Modification

The embodiments have been described above for the case where the image determiner 103 determines the size and the shape of the cover area. However, the size and the shape of the cover area may be specified by a user. For example, in FIG. 8, the user may select the second discolored area 511*a* as a cover area (which is thus displayed in the non-filled mode), and may further perform an operation to specify an area (for example, an inclusion area 515 shown in FIG. 9) greater than the second discolored area 511*a* by filling in the specified area or drawing an edge surrounding the specified area thereby specifying the size and the shape of the cover area.

The operation of specifying the cover area is not limited to filling in a particular area or drawing an edge of the particular area, but operations described below are also used. For example, in a state in which a desired cover area is selected, the user may drag a particular part (for example, an edge part) of the cover area in a direction away from the barycenter of the cover area thereby increasing the area size of the cover area. Alternatively, in a state in which a desired cover area is selected, the user may drag a particular part (for example, the edge part) of the cover area in a direction toward the barycenter of the cover area thereby reducing the area size of the cover area. Alternatively, the user may perform an operation to move a bar of an enlargement/reduction bar displayed on the screen provided for specifying enlargement/reduction of the cover area thereby specifying the size of the cover area.

Taking into the fact that it tends to be difficult to finely define the shape of the cover area by a touch operation by the user, the image processing apparatus 100 may correct the size and/or the shape of the cover area specified by the user based on the size and/or the shape of the first discolored area selected as cover areas in the past.

To make it easier for the user to specify the size and/or the shape of the cover area, the image processing apparatus 100 may display the first discolored area selected or/and determined as the cover area in the past such that this first discolored area is superimposed on the second face image, and may further display determination history information. The user may trace the shape of the first discolored area thereby easily specifying the shape. The user can compare the first discolored area selected as the cover area in the past with the second discolored area corresponding to this first discolored area thereby recognizing a change in the discolored area.

Fifth Modification

In the embodiments described above, in a case where there are a plurality of second discolored areas determined as cover areas, the image processing apparatus 100 (the image determiner 103 or a non-illustrated grouping processor) may perform a grouping process to determine one cover area containing a plurality of second discolored areas. A specific example is described below with reference to FIG. 11.

In FIG. 11, for example, let it be assumed that the second discolored areas 511c and 511d are determined as cover areas. In this case, for example, when a "grouping" button shown in FIG. 11 is operated by the user, the image processing apparatus 100 acquires a grouping rule from the storage apparatus 500. The grouping rule is a rule defined in advanced taking into account distances among the second discolored areas, sizes of the second discolored areas, a distribution of the second discolored areas, face parts where one or more second discolored areas exist, and/or the like. The grouping rule may include a rule of adjusting the size of the sheet depending on a skill of the user in terms of sticking the sheet.

Next, the image processing apparatus 100 determines, based on the grouping rule, whether it is allowed to incorporate the second discolored area 511c and the second discolored area 511d into a single area. In a case where such incorporating is not allowed, the image processing apparatus 100 may display, for example, a message or the like indicating that the grouping is not allowed on the display apparatus 300.

On the other hand, in a case where the incorporating is allowed, the image processing apparatus 100 determines one inclusion area 516 so as to include the second discolored area 511c and the second discolored area 511d as illustrated in FIG. 11. The image processing apparatus 100 displays the determined inclusion area 516 on the display apparatus 300.

Thereafter, for example, when a "print" button shown in FIG. 11 is operated by the user, the image processing apparatus 100 determines the inclusion area 516 as a cover area. Furthermore, the image processing apparatus 100 determines the print color depending on the color of the peripheral area outside the second discolored area 511c and the color of the peripheral area outside the second discolored area 511d in the inclusion area 516.

It is possible to group a plurality of discolored areas into one cover area by performing the grouping process in the above-described manner, and thus the user can easily stick the sheet so as to cover the plurality of discolored areas.

Note that the user may specify the shape and the size of an inclusion area (for example, the inclusion area 516 shown in FIG. 11) including a plurality of second discolored areas. For example, the user may specify an inclusion area by performing an operation to draw a contour (a circumference) of the inclusion area 516 including the second discolored areas 511c and 511d in FIG. 11. By selecting areas to be grouped, the user is allowed to adjust the size of the sheet (the print image size) depending on the user's sticking skill.

Sixth Modification

In the storage apparatus 500, the user identification information may include, in addition to the face image and the discolored area information, further information in terms of an age, an agenda, a nationality, a residence location, and a birthplace of the user, identification information indicating a cosmetic used by the user, a problem of the skin, an ideal skin state, a history of medical treatments (in terms of medical institution names, treatment dates, treated portions, etc.) the user received at medical institutions (a dermatology clinic, an aesthetic dermatology clinic, a cosmetic surgery clinic, etc.), which are stored in association with each other (which will be collectively referred to as "user-related information").

The user-related information is, for example, information obtained from information described in a questionnaire filled out by the user in a cosmetics shop, a medical institution, or the like or obtained via counseling for the user. The user-related information is input, for example, by a person at a shop, a medical institution, or the like or by the user using a particular terminal (such as a personal computer, a smartphone, a tablet device, etc.). The user-related information is transmitted to the storage apparatus 500 from the particular terminal and is stored in the storage apparatus 500 in association with the user identification information stored therein. Note that the user-related information may be input in the image processing apparatus 100 or the storage apparatus 500.

The image processing apparatus 100 may output user-related information (nationality, age, gender, etc.) and associated second discolored area information (the coordinates, the area size, the color difference, and the peripheral area color) of the second discolored area determined as the cover area to a particular apparatus (installed in, for example, a cosmetics development company, a cosmetics shop). The association described by these pieces of information makes it possible to recognize what kind of discolored area was selected as a cover area by what kind of user having a particular attribute. Thus, the information can be used in developing cosmetics, giving advice to a customer, recommending products, etc.

Seventh Modification

The discolored area extraction method, the type-of-cause determination method, the discolored area grouping method, the cover area determination method, the print material determination method, and the printing method are not limited to the examples described above. For example, as for the discolored area extraction method, the type-of-cause determination method, and the discolored area grouping method, known classification methods, pattern recognition methods, clustering methods, and optimization methods may be employed.

Examples known classification methods include a decision tree analysis, a neural network (including deep learning), and a naive Bayes classifier. Examples of known pattern recognition methods include the neural network (including deep learning) and a support vector machine (SVM). Examples of known clustering methods include a k-Nearest Neighbor algorithm (k-NN, k approximation method), a k-means clustering method, and a hierarchical cluster analysis. An example of a known optimization method is a genetic algorithm.

Eighth Modification

The image processing apparatus 100 may also output (display, output via sound/voice, or transmit) various kinds of information other than image data. Examples of various kinds of information are a face image, discolored area information, etc. For example, in cooperation with a display of an external apparatus such as a smartphone or the like of the user, an internal medicine or a meal menu effective for improving a discolored area may be proposed to the user. For example, in the case of chloasma, the image processing apparatus 100 may recommend ingestion of tranexamic acid or vitamin C.

Ninth Modification

Part of elements of the image processing apparatus 100 may be physically separated from the other part of the apparatus. In this case, a plurality of separate parts each need to have a communication unit to communicate with each other. For example, part of functions of the image processing apparatus 100 may be provided by a cloud computing system. The image processing apparatus 100 and the printing apparatus 400 may be integrated into a single apparatus. The installation locations of the image processing apparatus 100 and the printing apparatus 400 are not limited to the examples described above. For example, the printing apparatus 400 may be installed in a printing factory or the like apart from the image processing apparatus 100, and may receive image data via a communication network such as the Internet.

SUMMARY OF THE DISCLOSURE

The present disclosure provides an image processing apparatus that generates image data for use in printing an image on a sheet stickable to a skin, comprising: an image acquirer that acquires a first skin image obtained by capturing an image of a skin at a first timing and a second skin image obtained by capturing an image of the skin at a second timing later than the first timing, an image analyzer that determines a discolored area extracted from the first skin image as a first discolored area and extracts a color of the skin from the second skin image, an image determiner that determines a cover area, to be covered with the sheet, in the second skin image based on the first discolored area and determines a color of the cover area based on the color of the skin, and a print controller that generates image data with a content for printing an image of the determined cover area on the sheet by using a coloring material of the determined color.

In the image processing apparatus described above, the image analyzer may determine a discolored area extracted from the second skin image as a second discolored area, the image determiner may make a determination such that in a case where in the second discolored area, there exists a corresponding area corresponding to the first discolored area determined as the cover area in the past, the image determiner determines whether a predetermined condition is satisfied for the corresponding area, in a case where the predetermined condition is not satisfied, the image determiner may not adjust the predetermined threshold value while in a case where the predetermined condition is satisfied, the image determiner may adjust the predetermined threshold value so as to reduce the threshold value by a predetermined amount, and depending on whether a color difference between a color of the second discolored area and a color of a peripheral area outside the second discolored area is greater than or equal to the threshold value, the image determiner may determine the second discolored area as the cover area or a non-cover area which is not to be covered with the sheet.

In the image processing apparatus described above, the predetermined condition may be that the corresponding area is an area that has been subjected to a treatment in the past.

In the image processing apparatus described above, the predetermined condition may be that a rate of change based on a color difference of the corresponding area and a color difference of the first discolored area corresponding to the corresponding area is greater than or equal to a predetermined value.

In the image processing apparatus described above, the predetermined condition may be that a rate of change based on an area size of the corresponding area and an area size of the first discolored area corresponding to the corresponding area is greater than or equal to a predetermined value.

In the image processing apparatus described above, the predetermined condition may be that a color difference of the first discolored area corresponding to the corresponding area is greater than or equal to a predetermined value.

In the image processing apparatus described above, the predetermined condition may be that an area size of the first discolored area corresponding to the corresponding area is greater than or equal to a predetermined value.

In the image processing apparatus described above, the threshold value may be calculated based on a color difference and an area size of an area selected as the cover area from the first discolored areas by a user.

In the image processing apparatus described above, the threshold value may be calculated so as to further satisfy a condition that the threshold value decreases as a UV index increases.

In the image processing apparatus described above, the threshold value may be calculated so as to further satisfy a condition that the threshold value decreases as an amount of secretion of progesterone of the user increases.

In the image processing apparatus described above, the print controller may output the generated image data to a printing apparatus.

In the image processing apparatus described above, the image analyzer may generate an image by superimposing the cover area determined based on the first discolored area on the second skin image, and may output, to a display apparatus, the generated image together with history information indicating that the cover area was determined before the second timing.

In the image processing apparatus described above, the image analyzer may determine a discolored area extracted from the second skin image as a second discolored area, the image processing apparatus may further include an inputter that accepts an operation in terms of whether the first discolored area or/and the second discolored area are included in the cover area, and the image analyzer may make an adjustment such that in a case where the determined cover area includes a plurality of first discolored areas or/and second discolored areas, the image analyzer adjust a size or/and a shape of the determined cover area based on the operation accepted by the inputter.

In the image processing apparatus described above, the image analyzer may determines a discolored area extracted from the second skin image as a second discolored area, the image processing apparatus may further include a display that displays the determined cover area, and an inputter that accepts an operation in terms of a selection as to whether the first discolored area or/and the second discolored area are included in the cover area, and the display may change a transparency of an image displayed so as to be superimposed on the second skin image to indicate the first discolored area or the second discolored area, based on whether the first discolored area or/and the second discolored area are in a selected state.

The present disclosure provides an image processing method of generating image data for use in printing an image on a sheet stickable to a skin, including acquiring a first skin image that is an image of a skin captured at a first timing, determining a discolored area extracted from the first skin image as a first discolored area, acquiring a second skin image that is an image of the skin captured at a second timing later than the first timing, extracting a color of the skin from the second skin image, determining a cover area, to be covered by the sheet, in the second skin image based on the first discolored area and determining a color of the cover area based on the color of the skin, and generating image data with a content for printing an image of the determined cover area on the sheet by using a coloring material of the determined color.

The image processing apparatus and the image processing method according to the present disclosure are useful as an image processing apparatus and an image processing method capable of simply taking care of a discolored area of a skin.

What is claimed is:

1. An image processing apparatus that generates image data for use in printing an image on a sheet stickable to a skin, comprising:
    an image acquirer that acquires a first skin image obtained by capturing an image of a skin at a first timing and a second skin image obtained by capturing an image of the skin at a second timing later than the first timing;
    an image analyzer that determines a discolored area extracted from the first skin image as a first discolored area and extracts a color of the skin from the second skin image;
    an image determiner that determines a cover area, to be covered with the sheet, in the second skin image based on the first discolored area and determines a color of the cover area based on the color of the skin; and
    a print controller that generates image data with a content for printing an image of the determined cover area on the sheet by using a coloring material of the determined color.

2. The image processing apparatus according to claim 1, wherein
    the image analyzer determines a discolored area extracted from the second skin image as a second discolored area,
    the image determiner makes a determination such that in a case where in the second discolored area, there exists a corresponding area corresponding to the first discolored area determined as the cover area before the second timing, the image determiner determines whether a predetermined condition is satisfied for the corresponding area,
    the image determiner determines the second discolored area as the cover area or a non-cover area which is not to be covered with the sheet,
    in a case where the predetermined condition is not satisfied, the image determiner does not adjust a predetermined threshold value, depending on whether a color difference between a color of the second discolored area and a color of a peripheral area outside the second discolored area is greater than or equal to the predetermined threshold value, and
    in a case where the predetermined condition is satisfied, the image determiner adjusts the predetermined threshold value so as to reduce the predetermined threshold value by a predetermined amount, depending on whether a color difference between a color of the second discolored area and a color of a peripheral area outside the second discolored area is greater than or equal to the adjusted predetermined threshold value.

3. The image processing apparatus according to claim 2, wherein the predetermined condition is that the corresponding area is an area that has been subjected to a treatment before the second timing.

4. The image processing apparatus according to claim 2, wherein the predetermined condition is that a rate of change based on a color difference of the corresponding area and a color difference of the first discolored area corresponding to the corresponding area is greater than or equal to a predetermined value.

5. The image processing apparatus according to claim 2, wherein the predetermined condition is that a rate of change based on an area size of the corresponding area and an area size of the first discolored area corresponding to the corresponding area is greater than or equal to a predetermined value.

6. The image processing apparatus according to claim 2, wherein the predetermined condition is that a color difference of the first discolored area corresponding to the corresponding area is greater than or equal to a predetermined value.

7. The image processing apparatus according to claim 2, wherein the predetermined condition is that an area size of the first discolored area corresponding to the corresponding area is greater than or equal to a predetermined value.

8. The image processing apparatus according to claim 2, wherein the predetermined threshold value is calculated based on a color difference and an area size of an area selected as the cover area from the first discolored area by a user.

9. The image processing apparatus according to claim 8, wherein the predetermined threshold value is calculated so as to further satisfy a condition that the threshold value decreases as a UV index increases.

10. The image processing apparatus according to claim 8, wherein the predetermined threshold value is calculated so as to further satisfy a condition that the threshold value decreases as an amount of secretion of progesterone of the user increases.

11. The image processing apparatus according to claim 1, wherein the print controller outputs the generated image data to a printing apparatus.

12. The image processing apparatus according to claim 1, wherein the image analyzer generates an image by superimposing the cover area determined based on the first discolored area on the second skin image, and outputs, to a display apparatus, the generated image together with history information indicating that the cover area was determined before the second timing.

13. The image processing apparatus according to claim 1, wherein the image analyzer determines a discolored area extracted from the second skin image as a second discolored area, the image processing apparatus further comprises an inputter that accepts an operation in terms of whether the first discolored area or/and the second discolored area are included in the cover area, and the image analyzer makes an adjustment such that in a case where the determined cover area includes a plurality of first discolored areas or/and second discolored areas, the image analyzer adjust a size or/and a shape of the determined cover area based on the operation accepted by the inputter.

14. The image processing apparatus according to claim 1, wherein the image analyzer determines a discolored area extracted from the second skin image as a second discolored area, the image processing apparatus further comprises a display that displays the determined cover area, and an inputter that accepts an operation in terms of a selection as to whether the first discolored area or/and the second discolored area are included in the cover area, and the display changes a transparency of an image displayed in a manner of being superimposed on the second skin image so as to indicate the first discolored area or the second discolored area, based on whether the first discolored area or/and the second discolored area are in a selected state.

15. An image processing method for an image processing apparatus of generating image data for use in printing an image on a sheet stickable to a skin, comprising:

acquiring a first skin image that is an image of a skin captured at a first timing;

determining a discolored area extracted from the first skin image as a first discolored area;

acquiring a second skin image that is an image of the skin captured at a second timing later than the first timing;

extracting a color of the skin from the second skin image;

determining a cover area, to be covered by the sheet, in the second skin image based on the first discolored area and determining a color of the cover area based on the color of the skin; and generating image data with a content for printing an image of the determined cover area on the sheet by using a coloring material of the determined color.

* * * * *